2,838,877
Patented June 17, 1958

2,838,877
SOIL CONDITIONING

Kenneth C. Working, Long Beach, Calif.

No Drawing. Application May 4, 1953
Serial No. 353,000

6 Claims. (Cl. 47—58)

This invention relates to soil conditioning and is particularly directed to a soil additive which imparts to the soil a porous and open structure which has improved water retentive properties and improves the soil for germination of seed and growth of vegetable matter using the term in its generic sense.

It is particularly adapted for use in clay or adobe soils which cake readily, but has utility, also, in other types of light or open structure soils and improves the value of the soil for the growing of agricultural and horticultural plants and vegetables.

I have discovered that the aqueous acid extracts of the wood of redwood trees (*Sequoia gigantea* and *Sequoia sempervirens*) or the bark, wood or nuts from which tannins may be extracted, yield a material which, when neutralized, may be added to soil to greatly improve its agronomic value. The neutralized extract may be employed as a water solution or dispersion, or may be dried to a powder and employed as such. It may be employed in admixture with the extracted woody matter or with other woody matter or other fillers. The following examples are given by way of illustration and not as a limitation of this invention.

Example 1

Sawdust from the redwood trees is steeped in hot water at a temperature of 180° F., using enough water to cover the sawdust. The temperature is not critical and even boiling water may be used. The extract may be treated in various ways. For example, the mixture of sawdust and hot water which is now acid (around pH 4) may be neutralized, for example, with lime water

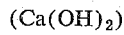

(Ca(OH)$_2$)

to bring the pH of the extract to about 7–8.

Instead of lime, I may use magnesium hydroxide, ammonia or alkali metal hydroxides or carbonates, for example, KOH or K$_2$CO$_3$. The use of the alkali metal hydroxides or carbonates may be permissible, especially where the addition of alkali metal ions to the soil is not undesirable.

The mixture of sawdust and neutralized extract can be added directly to the soil. I call this mixture "product I" in further discussion herein. On the other hand, the mixture product I may be evaporated to dryness and the mixed neutralized product and the sawdust employed. I call this mixture "product II" in further discussion herein. I may also separate the aqueous extract from the sawdust and use the solution, and I call this solution "product III" in further discussion. I may also evaporate the water solution after separation of the sawdust to form a dry powder of the neutralization product of the extract, and I call this material "product IV" in further discussion.

The solubility of the neutralization product varies with the alkali used to neutralize the acid extract and the concentration. Thus the lime neutralization product has but limited solubility at ordinary temperature and a saturated solution formed by neutralizing with lime the hot water extract will cause a precipitation of the lime neutralization product in the cold. I have found that the precipitate is equally effective as is the solution and may be redissolved and applied to the soil or applied directly by incorporating the precipitates into the soil.

The sawdust in product I and product II is believed merely a bulking agent and the dried extracted redwood sawdust may be mixed with product IV or any other inert bulking agent such as any other sawdust or humus material which will rot in the soil or any inorganic bulking agent such as specular hematite, vermiculite, perlite, or sand or diatomaceous earth may be employed.

It is believed important to note that redwood sawdust does not rot. However, sawdust extracted as above rots and disintegrates in the soil in the same manner as other types of wood sawdust and thus may be used as a bulking agent.

In addition to redwood, woods, nuts, and barks from which tannins may be extracted act similarly to redwood to yield a water extract which on neutralization will give an agronomically useful product. Thus, I may use the extract from Quebracho and treat it similarly to the treatment described for redwood sawdust under Example 1. Thus, for example, I may use chestnut wood, mangrove, wattle bark or myrobalan nuts. The above woods, bark or nuts are disintegrated into a fine powder or may be treated as chips and extracted with hot water and neutralized as described above.

In treating soil I may pour the extract solution produced from the woods, bark or nuts as described above and exemplified by product III or product IV on the soil or introduce the same into irrigation water. I may also redissolve the precipitate formed on cooling of the hot solution of the neutralization product as described above or produced as product IV and product I and apply it directly to the soil or irrigation water or redissolve it in water and apply the solution in the same manner.

On the other hand, I may incorporate the evaporated and dry mixture of the wood, bark or nut residue and the neutralization product as exemplified by product II into the soil; or I may incorporate into the soil the residue from the separated and evaporated extract as is exemplified by product II. I may also dissolve such product in water and apply it to the soil directly or add it to irrigation water.

I may also mix this residue with a bulking agent as described above and mix it into the soil.

To illustrate the advantages and utilities of the product and without intending the same to constitute any limitation on this invention, the following examples may be given by way of illustration:

Example 2

In an alkali soil, during the seasons where the temperatures ranged from 60–100° F. and in which corn refused to sprout and in which the seed became mouldy, I added one ounce of product II to each cubic foot of surface earth. About 50% of the seeds planted grew normally in contradistinction with the failure of the seeds to sprout in the same soil.

Example 3

Lettuce planted in the same soil as reported in Example 2 responded in the same manner as did the corn.

Example 4

Product II was added in the amount of one ounce per cubic foot of surface soil about a rose bush which appeared dead, i. e., no buds visible. The rose bush revived and gave vigorous new growth and roses. An adjacent bush in untreated soil remained in its original unhealthy state.

*Example 5*

The material was added in similar concentration as in Example 2 about lemon trees, orange, peach, and apricot trees which gave no growth or such small and immature fruit as to be useless. The trees revived and gave good yield of fully matured and large fruit.

While I do not wish to be bound by any theory of the reason for this action of my novel composition and its use as an agronomic aid, I believe that the action is due to some ingredient present in the extract other than tannin.

The material which I find valuable is the soluble material present in solution in the extract after neutralization. Thus, the redwood sawdust after the extract is neutralized and filtered from the solution shows little value, whereas the hot filtrate has the active ingredient.

While I have described a particular embodiment of my invention for the purpose of illustration, it should be understood that various modifications and adaptations thereof may be made within the spirit of the invention as set forth in the appended claims.

I claim:

1. As an agricultural soil additive a soluble lime salt of the acid extract from the wood of redwood trees, formed by extracting said wood in the form of sawdust, chips, and the like, with hot water and neutralizing the aqueous acid solution with lime.

2. A method of treating soil which comprises adding to the soil a neutralized acid extract from the wood of redwood trees, formed by extracting said wood in the form of sawdust, chips, and the like, with hot water and neutralizing the aqueous acid solution with an alkaline neutralizing agent.

3. A method of treating soil which comprises adding to the soil a lime salt of an acid extract from the wood of redwood trees, formed by extracting said wood in the form of sawdust, chips, and the like, with hot water and neutralizing the aqueous acid solution with lime.

4. A method of treating soil which comprises adding to the soil an aqueous acid extract of the wood of redwood trees having a pH of about 4, and formed by extracting said wood in the form of sawdust, chips, and the like, with hot water.

5. A method of treating soil which comprises adding to the soil a substance prepared by treating the wood of redwood trees in the form of sawdust, chips, and the like, with hot water containing lime.

6. An agricultural soil additive prepared by treating the wood of redwood trees in the form of sawdust, chips and the like, with hot lime water.

References Cited in the file of this patent

UNITED STATES PATENTS

| | | |
|---|---|---|
| 103,085 | Ruggles | May 17, 1870 |
| 509,703 | Taylor | Nov. 28, 1893 |
| 1,390,796 | Langford | Sept. 13, 1921 |
| 1,933,445 | Murdock | Oct. 31, 1933 |
| 2,033,411 | Carson | Mar. 10, 1936 |
| 2,092,100 | Waynick | Sept. 7, 1937 |
| 2,498,480 | Bierlich | Feb. 21, 1950 |
| 2,574,027 | Farber | Nov. 6, 1951 |

FOREIGN PATENTS

| | | |
|---|---|---|
| 1,070 | Great Britain | of 1879 |

OTHER REFERENCES

Hackh's Chemical Dictionary, third edition, published by Blakiston (Philadelphia), 1944, page 830.

McCool: "Studies on pH Values of Sawdusts," published 1949 at Yonkers, N. Y., in Contributions From Boyce Thompson Institute, vol. 15, pp. 279–282.

Youngman: "Farm and Garden Sawdust—for soil Conditioner and for Mulch," published June 11, 1950, in Washington (D. C.) Sunday Star, page B–7.